INVENTOR.
RICHARD F. POST
BY
ATTORNEY.

Feb. 4, 1964 R. F. POST 3,120,476
PYROTRON PROCESS AND APPARATUS UTILIZING
ENHANCEMENT PRINCIPLE
Filed April 28, 1958 2 Sheets-Sheet 2

INVENTOR.
RICHARD F. POST
BY
Roland A. Anderson
ATTORNEY.

United States Patent Office 3,120,476
Patented Feb. 4, 1964

3,120,476
PYROTRON PROCESS AND APPARATUS UTILIZING ENHANCEMENT PRINCIPLE
Richard F. Post, Walnut Creek, Calif., assignor to the United States of America as represented by the United States Atomic Energy Commission
Filed Apr. 28, 1958, Ser. No. 732,769
21 Claims. (Cl. 176—5)

The present invention relates, generally, to the confinement and manipulation of charged particles and, more particularly, to the utilization of such operations in enhancing the confinement and raising the temperature of charged particle constituents of a plasma The present application is a continuation-in-part of the copending application of Richard F. Post, Serial No. 443,447, filed July 14, 1954, and hereby incorporates by reference, pertinent subject matter disclosed therein. Such copending application discloses means and methods for manipulating and confining electrically charged particles so as to serve manifold utilitarian purposes with the invention being especially useful in the densification and raising of a plasma to extremely high temperatures whereat various nuclear and chemical reactions occur between the plasma constituents. Briefly, the invention disclosed in said copending application comprehends the employment of a magnetic containment system generally characterized as an axially symmetric magnetic field having spaced gradientially-intensified reflector field regions situated therein and providing a containment zone for charged particles in an evacuated space. The application also discloses methods and means for the injection, trapping, heating, compression, containment, and decompression of charged particles (ionized plasma) and the utilization of the products of various reactions which may be caused to occur. The present invention is of generally similar relevance and, in view of the pertinence to the especially valuable field of high energy plasma physics, the term "Pyrotron" has been conceived to designate devices and processes of the general character disclosed in the said copending and present applications. The term "Pyrotron" is herein taken to denote a device of the character described in the above-identified application and which employs a containment or reaction zone defined by an axially symmetric magnetic field having spaced gradientially-intensified reflector field regions therein. In Pyrotrons, an ionized plasma, i.e., a tenuous system of highly-ionized atomic nuclei and the associated electrons, of suitable fuel material (deuterium, tritium, or the like) and of whatever origin is provided in the containment zone defined by the indicated magnetic field. The plasma particles are both radially and axially confined within the containment zone by virtue of the configuration of the magnetic containment field, as is described in extensive detail in the above-referenced copending patent application. The confined particles are then adiabatically compressed within the containment zone as by appropriate manipulation of the containment field, or otherwise operated upon in such a manner as to materially increase the particle energy. At such increased energies nuclear pair reactions occur between the plasma particles upon collision of the individual particles with each other (e.g., the well-known DD pair reaction) which result in the release of neutrons and other nuclear constituents which are useful for a variety of purposes. For example, the neutrons released may be employed to bombard a fertile material, such as uranium-238, disposed peripherally about the containment zone and thereby breed fissionable material, such as plutonium-239.

The mechanism of particle confinement within a Pyrotron containment zone generally follows from the fundamental concept of charged particle motion in a magnetic field. More particularly, a charged particle in an evacuated space in which there is established an increasing-gradient axially symmetric magnetic field (e.g., a gradientially-intensified reflector field region), moves with a component of velocity translational to the direction of the increased gradient magnetic field and a component of velocity perpendicular to said direction constituting thereby an angular velocity in the axial magnetic field. The resulting path of the particle is consequently a helix with the axis parallel to the magnetic field axis. By virtue of the laws of conservation of momentum and total kinetic energy, the progression of the helical particle motion into the increasing field gradient causes the diameter of the helix to be decreased with a corresponding increase in angular velocity and decrease of moment of inertia, i.e., the angular velocity of the particle is increased due to the decreased radius of gyration in accord with the well-known cyclotron principle. Accordingly, the translational energy of the particle is proportionally reduced with the rotational energy increasing as a squared function of the velocity. Since the only source for the increasing rotational energy is the original translational energy of the particle, the translational energy is reduced with an attendant reduction in the translational velocity. The process is continual and, eventually, the translational velocity of the particle becomes zero. With this condition, any perturbation, i.e., disturbance in the motion of the particle, that results in a translational motion in the direction of the increasing field gradient will again cause increased rotational motion as outlined above. Conversely, a perturbation which results in translational motion opposite to the increased magnetic field results in continued motion in this direction whereby a reflection of the particle is effectively obtained. Not all particles progressing into the increased gradient field, however, are reflected since such gradient fields have an attendant loss cone, i.e., particles with a plurality of velocity vectors in velocity space having directions with respect to the field axis which lie within a solid angle determined by the magnitude of the field gradient escape through the gradient field. Only those particles are reflected which have sufficiently large ratios of initial rotational to initial translational energy that the corresponding resultant velocity vectors of the particles are directed at angles outside of the loss cone of the increased gradient field. In Pyrotron containment zones having reflector field gradients of practicable intensities, the maximum order of achievable particle reflection is of the order of 90%.

In order for chemical or nuclear reactions to be conducted with optimum efficiency in Pyrotrons, it will be appreciated that losses of charged fuel particles, as well as the resulting charged reaction products, from the containment zone by the above-mentioned mechanism, should be minimized to the maximum extent possible. The normal reflecting properties of the gradientially-intensified reflector field regions of the containment field should be enhanced to approach 100% particle reflection.

The present invention provides a method and apparatus which accomplish the foregoing enhancement of the reflection properties of increasing gradient magnetic fields by exciting the charged particles moving in the field to increase their initial rotational energies but not their translational energies. More particularly, in accordance with the method of the present invention the angular velocity of charged particles moving in an increasing gradient magnetic field is increased by exciting said particles in the uniform region of the magnetic field with an alternating electric field applied transversely to the axis of the magnetic field and preferably at the gyromagnetic resonant frequency of the particles. The applied electric field is effective in orienting the velocity vectors of substantially all of the charged particles to directions outside of the loss cone angle of the increased gradient magnetic field whereby substantially 100% of the particles are reflected therefrom. The method may be accordingly utilized to great advantage in Pyrotrons to materially increase the plasma containment properties of the magnetic containment zone thereof.

The method of the present invention may additionally be employed to accomplish continuous injection and heating of plasma particles in a particle heating process for linear multiple-zone Pyrotrons. Such process comprehends establishing an axially symmetric magnetic field having first and second magnetic reflector field regions therein with a first region of uniform magnetic field intensity extending from the first reflector field region to a second plateau region of lesser intensity and which terminates outwardly in the second reflector field region thus defining a linear multiple zone Pyrotron magnetic containment field. Charged particles are injected into the first region of uniform magnetic field intensity with a residual axial velocity by directing a beam of energetic ions through the first reflector field region. The ions are subjected to angular acceleration in the first region of uniform intensity by applying an alternating electric field in accordance with the present invention transversely across said first region of uniform intensity. The ratio of radial to axial velocity of the ions consequently increases whereby the reflecting properties of the reflector field regions are enhanced and the energy of the particles is increased. The angularly accelerated ions then continuously progress by preferential diffusion into the second plateau region of lesser magnetic intensity and are trapped and contained for appreciable times.

The invention also provides apparatus in the form of several preferred embodiments in which the foregoing methods may be conducted. Firstly, the invention is embodied in a single zone Pyrotron having an enhanced magnetic containment zone and comprising in general means for establishing in an evacuated space an axially symmetric magnetic field having spaced gradientially-intensified reflector field regions situated therein and thereby defining a containment zone, means for applying an alternating electric field across the central region of the indicated magnetic field, and means for introducing charged particles (plasma) to said containment zone.

Secondly, the invention is embodied in a linear multiple zone Pyrotron with enhanced injection and closure region connecting with a reaction zone in which the latter method hereinbefore described may be conducted. Said multiple zone Pyrotron generally comprises means for establishing within an evacuated space an axially symmetric magnetic field having spaced gradientially-intensified reflector field regions with a first plateau region of uniform magnetic field intensity defining a super heating zone and a second sink region of a lesser uniform field intensity defining a reaction zone between said reflector fields, means for directing energetic ions into the reflector field which adjoins said super heating zone, and means including radiofrequency electrode means disposed laterally of said first plateau region for applying a transverse alternating electric field thereto.

The invention further contemplates the employment of additional processes and apparatus of the nature disclosed in the previously referenced basic Pyrotron patent application for increasing the energy of charged particles trapped in a containment zone to initiate and/or promote chemical and nuclear reactions, utilizing the resulting nucleons produced in copious quantities or other reaction products to serve manifold utilitarian purposes, and the like.

Accordingly, it is an object of the present invention to provide a method and apparatus for limiting the motion of electrically charged particles to a specific direction.

Another object of the invention is the provision of a method and apparatus for enhancing the charged particle reflecting properties of an increasing gradient magnetic field.

Still another object of the present invention is to provide a method and apparatus for increasing the particle containment capabilities of a Pyrotron magnetic containment zone to approach 100%.

Yet another object of the present invention is to provide a Pyrotron having radiofrequency enhanced containment zone reflector field closure regions.

It is still another object of the present invention to provide a process and apparatus for the continuous injection and "heating" of fuel ions in a linear multiple zone Pyrotron having an enhanced magnetic containment zone.

It is a further object of the invention to provide a Pyrotron wherein end losses of charged particles are virtually eliminated.

A still further object of the invention is to provide for plasma mass transfer.

Other objects and advantages of the invention will become apparent by consideration of the following description taken in conjunction with the accompanying drawing, of which:

FIGURE 1, portion (A) is a graphical illustration of an axial magnetic field intensity profile of a typical axially symmetric Pyrotron magnetic containment field and portion (B) is a graphical illustration of the spatial distribution of the containment field as enhanced by an alternating electric field in accordance with the present invention, portion (B) being disposed in corresponding position beneath portion (A);

Figure 4A:
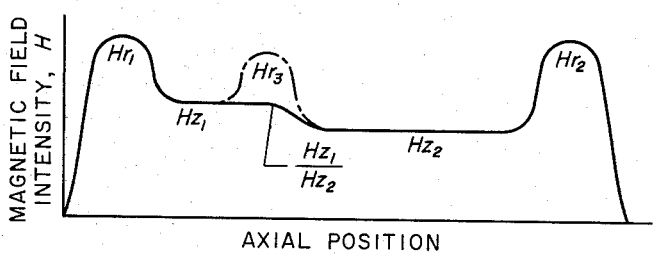
Figure 7:
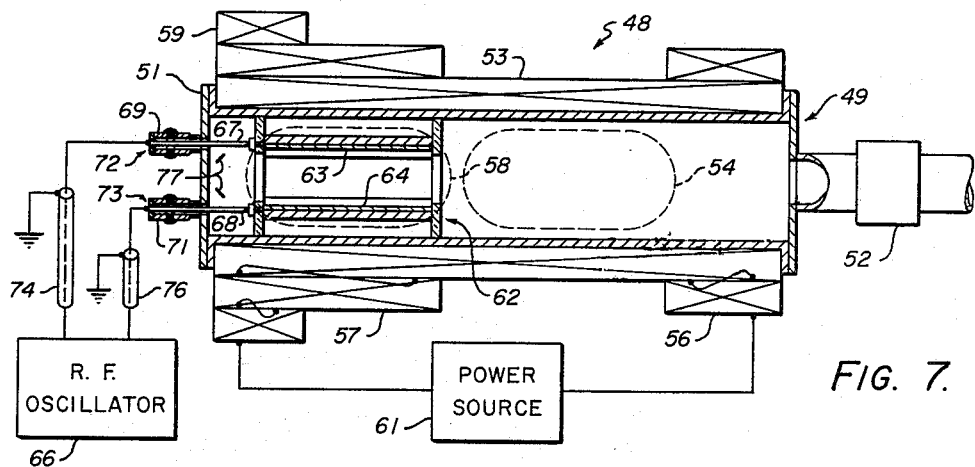
Figure 5:
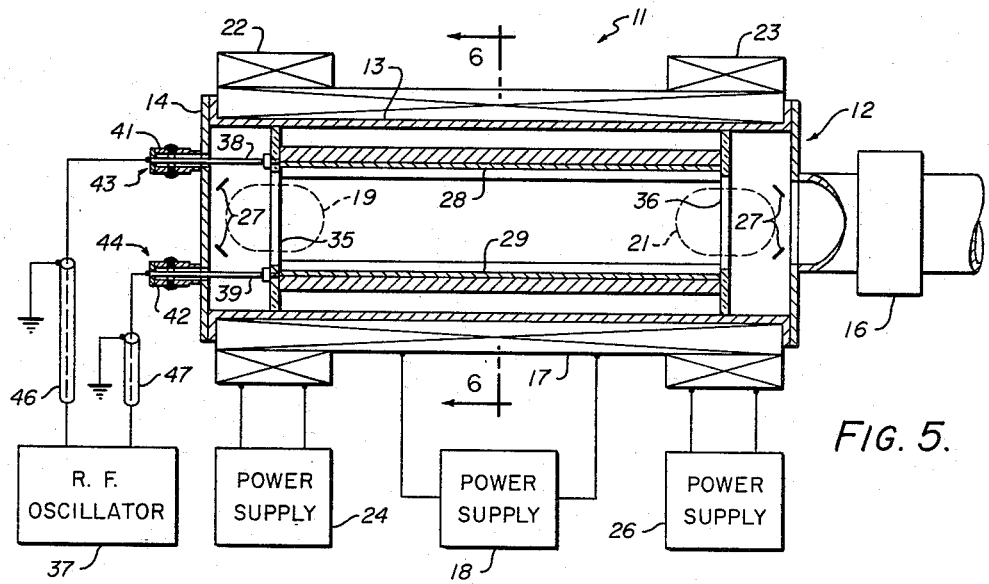
Figure 6:
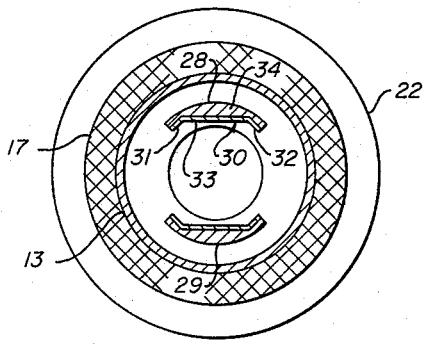

FIGURE 4, portion (A) is a graphical illustration of an axial magnetic field intensity profile of a linear multiple zone Pyrotron magnetic containment field, and portion (B) is a graphical illustration of the spatial distribution of the multiple zone containment field and including an alternating electric enhancement field applied in accordance with the present invention, portion (B) being disposed in corresponding position beneath portion (A);

FIGURE 5 is a side elevation sectional view of a single zone Pyrotron with enhanced magnetic containment zone in accordance with the invention;

FIGURE 6 is a cross sectional view taken along the line 6—6 of FIGURE 5 and illustrating the radiofrequency electrode structure of the embodiment thereof; and FIGURE 7 is a side elevation sectional view of a linear multiple zone Pyrotron with enhanced injection and closure zone in accordance with the invention.

Figure 1A:
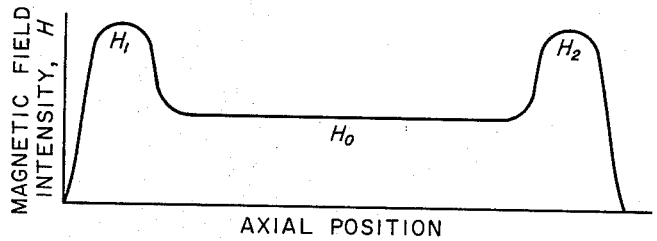
Figure 1B:
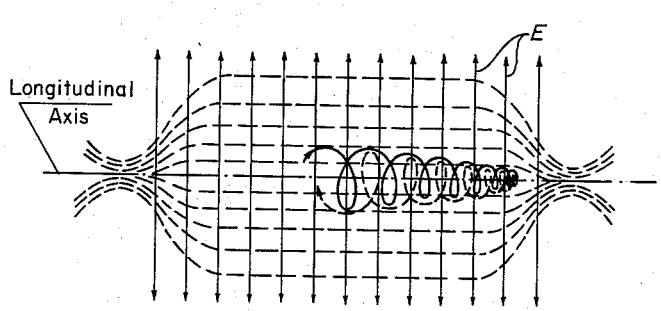

Considering now the present invention with respect to the method thereof and referring to FIGURE 1 of the drawing, it is contemplated that there will first be provided a Pyrotron magnetically contained reaction zone in accordance with the disclosure of the previously referenced copending patent application, Serial No. 443,447. Briefly, such reaction zone is established in an evacuated space and is defined by an axially symmetric magnetic field having a spatial configuration and corresponding axial intensity profile as respectively illustrated in portions (B) and (A) of FIGURE 1. The axially symmetric magnetic field is provided with a relatively elongated central region along which the magnetic field intensity, $H_0$, is approximately uniform and which merges smoothly with gradientially-increased terminal magnetic intensity reflector field regions, $H_1$ and $H_2$.

Energetic charged particles, i.e., particles which have finite velocites with radial and axial components and which may comprise the constituents of an ionized plasma of gaseous material, e.g., deuterium, tritium, and the like, introduced into the magnetic field will be trapped and contained therein, in accordance with conventional Pyrotron practice. The particles describe helical paths within the magnetic field as generally depicted by the typical path illustrated in FIGURE 1 (B), having an axis of rotation generally parallel with the longitudinal axis of the field, i.e., parallel to the magnetic lines of force. More particularly, the total kinetic energy, W, of a particle traversing a helical path may be considered as divided into two vectorial parts—a rotational energy, $W_\perp$ from motion perpendicular to the magnetic field and a translational energy, $W_\parallel$, from motion parallel to the field, so that at all times:

$$W = W_\perp + W_\parallel$$

As a particle moves into a region of intensified magnetization such as one of the reflector fields $H_1$, $H_2$, the translational component of energy, $W_\parallel$, is continually diminished and the angular energy, $W_\perp$, is continually increased until, under the proper conditions, such translational component vanishes and all of the particle energy is angular. The particular is accordingly stopped in a reflector region and the direction of travel along the axis of the containment field is reversed, whereby the particle is alternately reflected between the reflector field regions $H_1$ and $H_2$ and is, therefore, effectively contained.

The foregoing particle motion is extensively described and expressed mathematically in the basic Pyrotron patent application, Serial No. 443,447, and is therefore not described in detail herein. Moreover, such application sets forth a derivation of the condition governing reflection of the particles at the reflector field regions $H_1$ and $H_2$ as follows:

$$\frac{W_\parallel(0)}{W_\perp(0)} \leq \left[\frac{H_R}{H_0} - 1\right]$$

where:

$W_\parallel(0)$ = initial translational energy in central field region of intensity $H_0$.
$W_\perp(0)$ = initial perpendicular energy in central field region of intensity $H_0$.
$H_R$ = intensity of reflector field regions $H_1$, $H_2$.

Inasmuch as the energy of a particle is proportional to the square of its velocity, it follows from the foregoing expression that $$\frac{v_\parallel}{v_\perp} \leq \sqrt{\frac{H_R}{H_0} - 1}$$

where:

$v_\parallel$ = translational component of velocity.
$v_\perp$ = perpendicular component of velocity.

Figure 2:
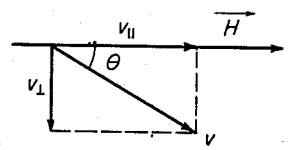
FIGURE 2 is a vectorial diagram indicating various relationships of particle velocities and magnetic field intensities employed in determining the angle of exclusion of particles from an increasing gradient magnetic reflector field.

Therefore, with reference to FIGURE 2 of the drawing, given a particle velocity, $v$, the ratio of the parallel $v_\parallel$, to perpendicular $v_\perp$ components of the particle velocity defines an angle, $\theta$, for which $$\tan \theta = \frac{v_\parallel}{v_\perp}$$

where $\theta$ must be greater than a minimum value, the angle of exclusion $\theta_0$, in order for the particle to be reflected in reflector field regions $H_R$ (i.e., $H_1$ and $H_2$). Thus $$\tan \theta \leq \frac{1}{\sqrt{\frac{H_R}{H_0} - 1}} \text{ for reflection}$$

Figure 3:
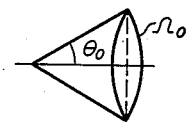
FIGURE 3 is a diagram illustrating relationships employed in calculating the solid angle of particle loss through an increasing gradient magnetic reflector field.

Moreover, for an incident random distribution of velocities, the exclusion angle $\theta_0$ is the half-angle of a solid angle $\Omega_0 = 2\pi(1 - \cos \theta_0)$, inside of which particles will escape through the reflector field regions $H_R$, i.e., solid angle $\Omega_0$ defines a reflector field region particle velocity escape cone as shown in FIGURE 3.

It is therefore readily apparent from the foregoing expressions that the ratio of perpendicular to translational velocity $$\frac{v_\perp}{v_\parallel}$$

of a particle may be increased to produce a corresponding increase in the velocity vector angle, $\theta$, of the particle.

Continuing now with the method of the invention in accordance with the salient aspects thereof, the velocity vector angle, $\theta$, of energetic charged particles (ionized fuel plasma) as may be confined within the Pyrotron magnetic containment defined by the magnetic field $H_1$—$H_0$—$H_2$ of FIGURE 1, or otherwise moving in an increasing gradient magnetic field, is increased by subjecting the particles to an accelerating electric field, E, oriented transverse to the direction of the magnetic field in order to increase the perpendicular component of particle velocity, $v_\perp$, without altering the translational component of velocity $v_\parallel$. The electric field, E, is applied in such a manner as to increase the velocity vector angles of substantially all charged particles to values beyond the exclusion angle $\theta_0$ for a given magnetic field gradient, e.g., $$\frac{H_R}{H_0} - 1$$

and therefore outside of the escape cone of angle $\Omega_0$ for such field gradient, whereby substantially all particles are reflected therefrom. More particularly, with particular reference to Pyrotrons, the electric field, E, is preferably established transversely across the central field region of uniform intensity, $H_0$, of magnetic containment field, $H_1$—$H_0$—$H_2$, as shown in FIGURE 1. The field is preferably alternating at a high frequency and may be established as by disposing axially elongated electrodes transversely spaced on opposite sides of the axis of central region $H_0$ and energized by a radiofrequency oscillator. The frequency, $f$, of the alternating electric field, E, and therefore of the energizing oscillations of the radiofrequency oscillator is selected such that the particles within the containment zone are continuously accelerated by the field in the angular direction of particle motion. The angular or perpendicular velocity $v_\perp$ of the particles consequently increased thus increasing the velocity vector angle $\theta$ to a value greater than the exclusion angle $\theta_0$ of reflector field regions $H_R = H_1 = H_2$, as previously described, whereby substantially all particles are confined within the magnetic containment zone. Frequency, $f$, is accordingly best selected as being equal to the well-known gyromagnetic frequency, $f_m$, of the particular particles (e.g., deuterons, tritons, electrons, or the like) within the containment zone (i.e., the frequency of rotation of the particles in undergoing helical motion in a uniform magnetic field), which frequency in cycles per second is given by:

$$f_m = \frac{eB_0}{2\pi mc}$$

where $e$ = charge of a particle
$m$ = mass of a particle
$c$ = velocity of light
$B_0$ = magnetic flux density corresponding to uniform field $H_0$ The foregoing expression may be employed to calculate the appropriate frequency of applied electric field E and for deuterons such frequency is calculated to be:

$$f = f_m = 8 \times 10^2 B_0 \text{ c.p.s.}$$

As is often the case in Pyrotrons, however, the thermonuclear fuel plasma includes a mixture of ionized charged particles (e.g., deuterons and tritons) whose atomic weight or ratio of mass-to-charge are multiple. In order that all of the particles in the mixture be reflected from reflector field regions $H_1$, $H_2$, in accordance with the method of the present invention, it is accordingly desirable in this case that the alternating electric field, E, include appropriate harmonics to excite all particles at their particular gyromagnetic frequencies to enhance reflection in the reflector field regions.

The previously described reflection enhancement method of the present invention additionally contemplates an increase in the kinetic energy (heating) of plasma particles in a magnetic containment zone. Inasmuch as the alternating electric field, E, is effective in increasing the angular component of particle velocity, $v_\perp$, there is an attendant increase in the angular component of particle energy, $W_\perp$, which is proportional to a squared function of the velocity. Therefore, there is a net gain in the particle energy, W. A Pyrotron magnetic containment zone enhanced in accordance with the method of the present invention may consequently be advantageously employed as a superheater zone for continuously injecting heated fuel into an adjoining reaction zone of an enhanced linear multiple zone Pyrotron. More particularly, there will first be provided in an evacuated space, a multiple region axially symmetric magnetic field having a configuration of the general form illustrated in FIGURE 4 of the drawing, and thereby defining adjoining magnetically contained zones of a multiple zone Pyrotron. As shown in the figure, a magnetic containment field is provided having first and second gradientially-intensified terminal reflector field regions $Hr_1$, $Hr_2$ with a superheater region of uniform intensity $Hz_1$, extending from reflector field region $Hr_1$ to a plateau reaction region of lesser intensity $Hz_2$ and which terminates outwardly in reflector field region $Hr_2$. Such multiple region containment zone may be established by disposing an elongated solenoidal winding within an evacuated space to establish region $Hz_2$ while disposing a solenoidal segment about one end to provide region $Hr_2$. Another solenoidal segment may be disposed about the other end of the solenoidal winding and extends inwardly to intensify the intensity $Hz_2$ and uniformly provide region $Hz_1$ smoothly diminishing in region $Hz_1/Hz_2$ to region $Hz_2$. Still another solenoidal segment may be disposed about the end of the second segment to augment the intensity $Hz_2$ and thereby establish region $Hr_2$.

In the initial steps of the process, charged particles (ionized plasma) are introduced into the superheater zone defined by field region $Hz_1$ as by any one of the various injection methods disclosed in the basic Pyrotron patent application, Serial No. 443,447. The plasma may be introduced for example by directing a space charge neutralized ion beam through reflector field region $Hr_1$ at the axis thereof and into superheater region $Hz_1$.

Figure 4B:
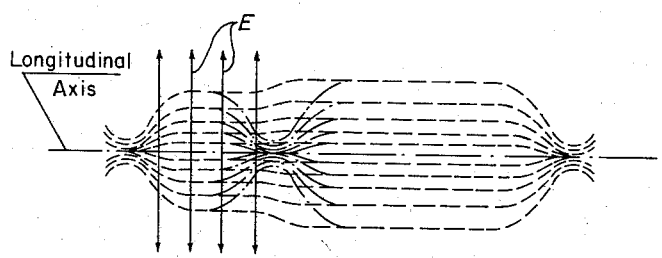

An alternating electric field, E, is applied in accordance with the present invention transversely across the multiple region containment zone, preferably in the superheater region $Hz_1$, to enhance the reflecting properties of the increasing gradient reflector field regions $Hr_1$, $Hr_2$ (see FIGURE 4(B)). Superheater region $Hz_1$ is accordingly comparable to an enhanced single region containment zone of the type previously described wherein an attendant increase in plasma particle energy is obtained by virtue of the reflection enhancing alternating electric field.

Such alternating electric field may be applied as in the case of a single region containment zone by disposing radiofrequency electrodes oppositely across superheater zone $Hz_1$ and applying radiofrequency energy thereto as may be supplied by an oscillator. The alternating electric field thus enhances the reflection properties of reflector field regions $Hr_1$, $Hr_2$ and increases the energy of plasma particles by angular acceleration thereof in superheater zone $Hz_1$ in accordance with the method of the present invention. The accelerated particles provided in superheater zone $Hz_1$ then continuously progress by preferential diffusion to the reaction zone of lower intensity $Hz_2$. The accelerated particles are trapped and contained within reaction zone $Hz_2$ for appreciable times during which the particle may be further operated upon in accordance with conventional Pyrotron practice to establish nuclear pair or other reactions. Substantially no particles are lost through reflector field region $Hr_2$, since the particle velocity vectors are oriented outside of the escape cone angle of the reflector field regions by the method of the present invention. Accordingly particle escape from reaction zone $Hz_2$ is generally limited to one direction, viz, back to superheater zone $Hz_1$. Particles tending to be lost from reaction zone $Hz_1$ are accordingly accelerated angularly in superheater zone $Hz_1$ and returned to the reaction zone in superheated condition.

It will be appreciated that the method of the present invention may be further modified as by providing a reflector field region $Hr_3$ between superheater region $Hz_1$ and reaction region $Hz_2$. Such reflector field region $Hr_3$ is preferably established by disposing a solenoidal segment about the inner end region of the solenoidal segment of previous mention establishing superheater region $Hz_1$ and energizing same with direct current. Plasma particles are thus accumulated and angularly accelerated in superheater zone $Hz_1$ to form a heated fuel charge. The direct current is then periodically diminished to diminish the intensity of reflector field region $Hr_3$ resulting in the periodic transfer of the fuel charge to reaction zone $Hz_2$. The method may accordingly be utilized to accomplish plasma mass transfer.

Considering now what may be considered as preferred apparatus and structure for conducting the methods and processes hereinbefore described and referring to the illustrated form thereof in FIGURE 5 of the drawing, there is provided a single zone Pyrotron 11 of generally conventional construction and modified in accordance with the present invention. In order to provide the previously indicated evacuated space, Pyrotron 11 includes a vacuum chamber 12, which is preferably constructed as an elongated cylindrical tube 13 of suitable magnetically pervious structural material, e.g., stainless steel. The ends of tube 13 are best flanged to facilitate pressure sealed attachment of a closure plate 14 at one end and suitable vacuum pump and cold trap means 16 at the other to evacuate chamber 12 to vacuum dimensions of the order of $10^{-7}$ millimeters of mercury.

Means are provided for establishing a conventional axially symmetric Pyrotron magnetic containment field within the evacuated chamber 12 and such means may comprise a solenoidal coil winding 17, disposed concentrically about chamber 12, so as to enclose a substantial length thereof. Winding 17 is preferably uniformly distributed and is therefore capable of providing, at least, the central region of uniform intensity, $H_0$ (see FIGURE 1) along a substantial length of chamber 12 upon being energized by electrical current from a suitable power supply 18. Such power supply is provided in accordance with conventional Pyrotron practice and is accordingly one which is capable of storing substantial amounts of electrical energy, e.g., large capacitor banks precharged to high voltage.

The gradientially-intensified reflector field regions (hereinbefore designated as $H_1$ and $H_2$) are preferably provided in terminal regions 19, 21 of chamber 12 (which regions are enclosed by corresponding terminal portions of solenoidal winding 17) by disposing solenoidal segments 22, 23, respectively, coaxially thereabout. Solenoidal segments 22, 23 may be energized as by means of power supplies 24, 26 respectively connected thereto and generally similar in construction to power supply 18. Alternatively, segments 22, 23 may be connected in additive series with winding 17 and energized by a common power supply to establish containment field $H_1$—$H_0$—$H_2$. Moreover, the containment field may be variously manipulated by apparatus connected to the field producing solenoids as provided by the hereinbefore referenced basic Pyrotron patent application to accomplish injection, compression and decompression of the fuel plasma as well as other Pyrotron processes.

Ion sources 27 may be disposed centrally or in radial banks for example outside of terminal regions 19, 21 (i.e., outside of reflector field regions $H_1$, $H_2$) at positions outwardly of about the terminal planes of solenoids 22, 23, to provide fuel ion beams directed in accordance with considerations noted hereinbefore with respect to the method of the invention. Such ion sources 27 may additionally be disposed at other positions relative to the magnetic containment field producing solenoids 17, 22, 23 in accordance with conventional Pyrotron practice, e.g., slightly inwardly of the central transverse planes of solenoids 22, 23 so as to be positioned relative to the containment field in the gradient field portions between the reflector field regions $H_1$, $H_2$ respectively and central field region $H_0$. Ion sources 27 are of conventional design such as are disclosed in U.S. Patent 2,786,143 which issued to L. Ruby et al., Mar. 19, 1957.

As regards preferred structure for establishing the novel radiofrequency enhancing electric field transversely across the central field region $H_0$, such structure is best provided as axially elongated radiofrequency electrodes 28, 29 disposed oppositely across the central region of vacuum chamber 12 approximately bounded by the central transverse planes of solenoids 22, 23. Electrodes 28, 29 are best provided as having a trough-like cross section as illustrated in FIGURE 6 of the drawing, in order to effect a substantially uniform electric field configuration regardless of the wall effect of the metallic vacuum chamber 12. More particularly, in the preferred construction of each one of electrodes 28, 29, relatively thin elongated sheets 30 of electrically conducting material such as stainless steel are longitudinally bent in cross sectional form as an open symmetrical trapezoid with similar side sections 31, 32 each at approximately 45° to a base section 33. In order that the electrodes be self-supporting between the ends thereof, each electrode also includes a substantially rigid elongated arcuate backing member 34 fabricated for example from stainless steel and secured in circumscribing relationship to the outside faces of side and base sections 31, 32, 33 by any suitable means of rigid attachment such as spot welding.

To facilitate mounting of electrodes 28, 29 within vacuum chamber 12 in the previously indicated relationship, support rings 35, 36 of electrical insulating material, e.g., "Pyrex" are attached, as by fusing, to the ends of electrodes 28, 29, respectively, with the electrodes in symmetrical diametric opposition. The outside diameter of support rings 35, 36 is made approximately equal to the bore diameter of tube 13 of vacuum chamber 12 whereby the entire end supported electrode assembly may be axially translated into position within the chamber prior to installation of end closure plate 14.

Electrodes 28, 29 are energized by a suitable source of radiofrequency energy, preferably, at least one variable frequency oscillator 37 connected thereto and capable of delivering radiofrequency output voltage of the order of 2 kv. amplitude. To facilitate connection of the oscillator to the electrodes, suitable conducting rods 38, 39 are connected to electrodes 28, 29, respectively, and extend axially through hermetically sealed electrically insulated coaxial feedthrough couplers 41, 42 respectively provided in closure plate 14 to terminate thereat in conventional coaxial transmission line energizing terminals 43, 44. Oscillator 37 may then be connected by means of coaxial transmission lines 46, 47 to terminals 43, 44 to energize electrodes 28, 29 and thus establish the indicated alternating electric enhancing field transversely across the magnetic containment zone defined by the magnetic field within vacuum chamber 12. Moreover, the frequency of oscillator 37 is adjusted equal to the gyromagnetic frequency of the particular thermonuclear fuel particles supplied by ion sources 27 to the containment zone. Therefore, the velocity vector angles of said fuel particles are oriented outside of the loss cone angles of reflector field region $H_1$ and $H_2$ of the containment zone defining field resulting in substantially complete elimination of end losses of fuel particles therefrom with an attendant increase in the efficiency with which reactions may be conducted within the Pyrotron 11.

Considering now an enhanced linear multiple zone Pyrotron 48 in accordance with the present invention as illustrated in FIGURE 7 of the drawing, and which may be employed to conduct the continuous injection and heating processes hereinbefore described, there is provided a vacuum chamber 49, generally similar in construction to the vacuum chamber 12 of the single zone Pyrotron hereinbefore described. More particularly, chamber 49 is similarly closed at one end by a closure plate 51, and connected at the other end to vacuum pump and cold trap means 52. Such means are effective in exhausting chamber 49 to high vacuum dimensions, thus establishing an evacuated space.

A multiple region magnetic containment field in accordance with the processes previously described (i.e., magnetic field $Hr_1$—$Hz_1$—$Hz_2$—$Hr_2$ of FIGURE 4) is established longitudinally of chamber 49 by field generating means including an elongated solenoidal winding 53 concentric with reference to said chamber 49. Winding 53, upon being energized, provides in a reaction zone 54, the intensity, $Hz_2$, of the generally uniform region of the multiple region field.

A solenoidal segment 56 disposed concentrically about one end region of solenoidal winding 53, preferably the end corresponding to the end of chamber 49 coupled to vacuum pump and cold trap means 52, may be advantageously employed to establish the gradientially-intensified reflector field region $Hr_2$ of the containment field upon energization. Similarly, another solenoidal segment 57 is preferably disposed about the other end region of winding 53 and extends inwardly to facilitate intensification of the magnetic field intensity and thereby uniformly provide region, $Hz_1$, of the field. Region $Hz_1$, in the region $Hz_1/Hz_2$ gradientially diminishes to intensity $Hz_2$, providing thereby a "superheater" zone 58 of magnetic intensity $Hz_1$, connecting with reaction zone 54 in accordance with the processes previously described. Finally, a solenoidal segment 59 may be disposed concentrically about the outer end region of solenoid 57 so as to augment the magnetic field intensity in this region, upon energization, providing the reflector field region $Hr_1$ of the multiple region containment field.

Energization of solenoids 53, 56, 57, 59 is best facilitated in accordance with conventional Pyrotron practice. For example, such solenoids may be connected in additive series, as illustrated in the figure, and coupled to a suitable D.C. power source 61 capable of continuously generating large currents, e.g., extremely large generators or banks thereof, capacitor bank-rectifier systems, and the like. It will be appreciated that the solenoids may additionally be individually energized by separate power sources or by any other scheme predicated by the particular application for which the Pyrotron is employed.

As regards the alternating electric enhancing field to be established transversely across superheater zone 58 defined by region $Hz_1$ of the magnetic field in accordance with the salient aspects of the invention, it is to be appreciated that preferred structure for generating such electric field follows from that previously described with respect to the single zone Pyrotron 11 of FIGURES 5 and 6. More specifically, a radiofrequency electrode assembly 62, which is generally similar in construction to the assembly hereinbefore described in detail including electrodes 28, 29 and support rings 35, 36 is coaxially disposed within vacuum chamber 49 centrally of superheater zone 58. The trough-shaped radiofrequency electrodes 63, 64 of assembly 62 are thus oppositely disposed transversely across superheater zone 58.

Suitable electrical energy input means are provided to facilitate energization of electrodes 63, 64 with radiofrequency energy supplied as by means of a variable frequency oscillator 66. Such input means preferably include conducting rods 67, 68 respectively connected to electrodes 63, 64 and extending axially through hermetically sealed insulated coaxial feedthrough coupler 69, 71 respectively provided in closure plate 51 to terminate thereat in conventional coaxial transmission line energizing terminals 72, 73 in a similar manner to that described relative to single zone Pyrotron 11. Oscillator 66 is then connected by means of coaxial transmission lines 74, 76 to terminals 72, 73 respectively to energize electrodes 63, 64 and thus establish the previously indicated alternating electric enhancing field transversely across superheater zone 58.

In order to introduce charged particles to superheater zone 58 in the manner of the processes of the present invention, ion sources 77, similar in construction to ion sources 27, are disposed centrally or in radial banks axially outward from superheater zone 58 as disclosed in the previously referenced basic Pyrotron application. Sources 77 direct a space charge neutralized ion beam into the reflector field region $Hr_1$ of the multiple region containment zone defining field. The ion beam penetrates field region $Hr_1$ as at the axis thereof where the lines of magnetic flux are substantially entirely longitudinally oriented, to then enter superheater zone 58 defined by field region $Hz_1$. The frequency of variable frequency oscillator 66 is adjusted equal to the gyromagnetic frequency of the particular fuel ions utilized. The fuel ions are accordingly subjected to radial acceleration in superheater zone 58 by the alternating electric energy supplied by electrodes 63, 64 whereby the ratio of radial to axial velocity also increases. Such ratio increase effects an orientation of the velocity vectors of the fuel ions which lies outside of the escape cone angles of the terminal closures defined by reflector field regions $Hr_1$, $Hr_2$. Moreover, since the radial component of velocity of the particles increases, there is an attendant increase in the radial component of energy of the ions and therefore in the overall energy of the ions. The constituents of the plasma are accordingly heated (increased in kinetic energy) in the superheater zone 58. Inasmuch as reaction zone 54 is defined by region $Hz_2$ of the multiple region magnetic containment field which is of lesser intensity than that of region $Hz_1$ defining superheater zone 58, the heated fuel ions continuously progress by preferential diffusion in the direction of reaction zone 54 and are trapped and contained therein for appreciable times as follows from the hereinbefore described process. The ions will not escape through the end closure defined by reflector field region $Hr_2$, because of the enhancement effected by the alternating electric field. Axial loss of the fuel ions from reaction zone 54 is accordingly limited to the direction toward superheater zone 58. Those ions tending to escape axially from the reaction zone are thus returned to the superheater zone and are radially accelerated therein by the electric field to be subsequently returned in superheated condition to reaction zone 58 whereby relatively little additional heating by conventional Pyrotron magnetic adiabatic compression processes and the like is required to initiate and promote nuclear or chemical reactions at substantial reaction rates. The linear multiple zone Pyrotron 48 accordingly facilitates the conduction of chemical and nuclear reactions with increased efficiency of operation.

In order to demonstrate the manner in which the improvement of the present invention may be applied to any Pyrotron, given a specific set of structural parameters, by way of example only, consider the specifications of the operating embodiment of the Pyrotron presented in my previously referenced copending application S.N. 443,447. These specifications are as follows:

Central field ($H_0$)—15 kilogauss.
Reflector fields ($Hr$)—30 kilogauss.
Rise time of fields—500 microseconds.
Decay time of fields (½ intensity)—7 to 8 milliseconds.
Field generating solenoid:
    Inner diameter—7½ inches.
    Length—44 inches.
    Turns in central field region—84.
    Turns in reflector field regions—26 and 30.
    Wire size—gauge No. 1 copper.
    Inductance—0.8 millihenry.
Solenoid energizing source—two 318 microfarad condenser banks charged to 20 kilovolts and discharged in series to apply 159 microfarad at 40 kilovolts across the solenoid.
Particle source:
    Deuterium charged—500 volts accelerating potential.
    Particle density in containment field—approximately $10^{12}$ ions per cubic centimeter.

Knowing the foregoing specific parameters, the values of a corresponding set of parameters for the radio frequency enhancement field of the present invention to increase the containment capabilities of the device are readily computed from the data and formulae set forth hereinbefore.

More specifically, the output voltage of variable frequency oscillator 37, and therefore the amplitude of enhancement field, E, is approximately 2 kilovolts (see column 10, line 8).

The frequency of the radio frequency voltage of oscillator 37, and therefore of the enhancement field, from the formula at line 16, column 7 is $$f = 8 \times 10^{12} \times 15{,}000 \text{ gauss} = 12 \text{ megacycles}$$

With the foregoing specific parameters of enhancement field employed, the deuterons are resonantly accelerated in cumulative fashion by the enhancement field with a resultant increase in their translational energies. The resultant velocity vectors of the deuterons are thereby oriented outside of the loss cone angles of the reflector fields such that the containment time of the deuterons is increased and therefore they have greater opportunity to collide and undergo pair reactions.

For other sets of Pyrotron parameters and other charged particles employed, the procedure for selection of the corresponding enhancement field parameters is similar to that just set forth, the appropriate enhancement field frequency for any particles introduced to a specific Pyrotron magnetic containment zone being directly derivable from the general formula set forth at line 3, column 7.

While the present invention has been hereinbefore described in terms of specific steps in the methods and with respect to but several preferred embodiments, it will be apparent that numerous modifications and variations are possible within the spirit and scope of the invention and thus it is not intended to limit the invention except by the terms of the following claims.

What I claim is:

1. A method of reflecting moving plasma particles in an increased gradient axially symmetric magnetic field oriented parallel to the longitudinal translation of said particles comprising the step of increasing the ratios of angular velocity to translational velocity of said particles by exciting the particles with a radio frequency electric field applied transverse to the axis of said magnetic field in a region of lesser than peak intensity to orient the velocity vector of said particle to a direction outside of the loss cone angle of the increased gradient magnetic field.

2. A method of confining plasma moving in a Pyrotron containment zone comprising the steps of generating in an evacuated space an axially symmetric magnetic field having axially spaced gradientially-intensified reflector field regions situated therein and thereby defining said containment zone, the charged particles of said plasma within the containment zone moving along helical paths with axes parallel to the axis of said magnetic field, and imparting angular acceleration to said particles by applying a radio frequency electric field transversely to the direction of said magnetic field to increase the angular velocity of said particles and thereby orient the resultant velocity vectors of said particles to directions outside of the loss cone angle of the gradientially-intensified reflector field regions whereby substantially all particles are confined within said zone.

3. A method of increasing the energy of electrically charged particles of positive and negative polarities coexistent in a Pyrotron containment zone defined by an axially symmetric magnetic field having axially spaced gradientially-intensified reflector field regions situated therein, comprising the operational step of establishing a radio frequency electric field transversely across said magnetic field to impart rotational energy to said particles.

4. In a linear multiple zone Pyrotron including an axially symmetric magnetic field established in an evacuated region and having first and second gradientially-intensified reflector field regions therein with a first region of uniform intensity extending from said first reflector field region to a second plateau region of lesser intensity and which terminates outwardly in said second reflector field region to thereby define first and second adjoining magnetically contained zones for confining electrically charged particles of a plasma, the operational step comprising generating a radio frequency electric field transversely across said magnetic field in said first region of uniform intensity to increase the rotational energy of particles of a plasma therein with the particles of increased energy continuously progressing by preferential diffusion into said second plateau region to be trapped therein for appreciable periods of time.

5. In a Pyrotron having an axially symmetric magnetic field with axially spaced gradientially-intensified reflector field regions of intensity Hr, terminally bounding a uniform central field region of lesser intensity, $H_0$, thereby defining a magnetic containment zone in which plasma particles are confined, the method comprising generating a radiofrequency electric field transversely across said central field region to decrease the ratio of translational to angular velocity, $v_\parallel/v_\perp$ of said plasma particles to values given by the expression:

$$\frac{v_\parallel}{v_\perp} \leq \sqrt{\frac{Hr}{H_0}-1}$$

6. A method according to claim 5, in which the frequency of said radiofrequency electric field is equal to the gyromagnetic frequency of said plasma particles.

7. A Pyrotron method comprising the steps of establishing in an evacuated region an axially symmetric magnetic field having a uniform central field region of intensity $H_0$ terminally bounded by gradientially-intensified reflector field regions of intensity Hr and thereby defining a magnetic containment zone, introducing space charge neutralized ions into said containment zone whereby the ions traverse helical paths having axes of rotation generally parallel to the axis of said magnetic field and with translational and angular components of velocity, $v_\parallel$ and $v_\perp$, respectively, and exciting said ions with an alternating electric field applied transversely across said central field region with a frequency equal to the gyromagnetic frequency of said ions to increase the angular component of velocity, $v_\perp$, of the ions to values yielding decreased ratios of translational to angular velocity, $$\frac{v_\parallel}{v_\perp}$$

of the particles given by the expression:

$$\frac{v_\parallel}{v_\perp} \leq \sqrt{\frac{Hr}{H_0}-1}$$

whereby quantities of said ions closely approaching 100% are trapped and confined within said containment zone.

8. A method according to claim 7 but wherein said ions comprise a mixture of ions whose mass-to-charge ratios are multiple and said electric field is applied with a group of harmonically related frequencies corresponding to the gyromagnetic frequencies of the fuel ions of said mixture.

9. A method according to claim 7 further defined by said ions being deuterons and the frequency, $f$, of said electric field being determined by the expression: $f = 8 \times 10^{12} B_0$ cycles per second, where $B_0$ is the magnetic flux density corresponding to the field intensity $H_0$.

10. A method of continuously injecting and confining heated ions in a linear multiple zone Pyrotron comprising the steps of generating in an evacuated region an axially symmetric magnetic field having first and second gradientially-intensified reflector field regions, $Hr_1$, $Hr_2$ therein of equal intensity Hr with a first region of uniform intensity $Hz_1$ extending from said reflector field region $Hr_1$ to a second plateau region of lesser intensity $Hz_2$ and which terminates outwardly in said reflector field region $Hr_2$, directing a beam of energetic ions through said reflector field region $Hr_1$ into said region of uniform intensity $Hz_1$ with some residual axial velocity $v_\parallel$, and exciting said ions with an alternating electric field applied transversely across said region of uniform intensity $Hz_1$ to accelerate said ions radially and establish angular components of particle velocity $v_\perp$ yielding ratios of axial to angular particle velocity, $$\frac{v_\parallel}{v_\perp}$$

smaller than $$\sqrt{\frac{Hr}{Hz_1}-1}$$

whereby the energy of said ions is increased in said region $Hz_1$, and the ions of increased energy continuously progress by preferential diffusion into said region $Hz_2$.

11. A method according to claim 10 wherein the frequency of said alternating electric field is equal to the gyromagnetic frequency of said ions.

12. A method of transferring a heated plasma mass comprising the steps of generating in an evacuated region an axially symmetric magnetic field having first and second gradientially-intensified terminal reflector field regions therein and a third gradientially-intensified reflector field region disposed intermediate said first and second reflector field regions with a first region of uniform intensity extending inwardly from said first reflector field region to said third reflector field region and a second plateau region of lesser intensity than said first region of uniform intensity extending outwardly from said third reflector field region to said second reflector field region, introducing plasma through said first reflector field region into said first region of uniform intensity with the plasma particles having some residual axial velocity, applying an alternating electric field transversely across said first region of uniform intensity to radially accelerate said particles therein and thereby impart rotational energy to said particles, and periodically diminishing the intensity of said third reflector field region to transfer a heated mass of plasma by preferential diffusion from said first region of uniform intensity into said second region of lesser intensity for confinement therein.

13. A device for reflecting charged particles of a plasma comprising means for establishing an evacuated region, means disposed within said region for generating an axially symmetric magnetic field having at least one region of increasing field gradient, means for introducing a plasma into said magnetic field with the particles of said plasma moving in a direction parallel to the axis of said magnetic field and toward said region of increasing field gradient, and means disposed within said evacuated region to provide a radiofrequency electric field in a direction transverse to the axis of said magnetic field to impart radial acceleration to said particles and thereby establish angular components of particle velocity whereby the particles are reflected from said region of increasing field gradient.

14. A device as defined by claim 13 further defined by said means for generating an alternating electric field comprising a pair of radiofrequency electrodes disposed oppositely across the axis of said magnetic field, and a radiofrequency oscillator coupled between said electrodes for generating a radiofrequency voltage at the gyromagnetic frequency of said charged particles.

15. A particle containment device comprising an evacuated vacuum chamber, a solenoidal coil winding disposed coaxially about said chamber, a pair of solenoidal segments disposed concentrically about the end regions of said solenoidal coil winding, electrical energy source means connected to said solenoidal segments and coil winding for energizing same to establish an axially symmetric magnetic field having axially spaced gradientially-intensified reflector field regions situated therein corresponding to said solenoidal segments, ion source means communicating with said vacuum chamber for introducing charged particles to said magnetic field, a pair of axially elongated radiofrequency electrodes disposed oppositely across the central region of said vacuum chamber and bounded terminally by the central transverse planes of said solenoidal segments, and a radiofrequency oscillator connected across said electrodes to establish an alternating electric enhancing field transverse to said magnetic field for imparting rotational energy to said particles.

16. A particle containment device as defined by claim 15 wherein said radiofrequency electrodes have a trough-like cross section and a pair of electrically insulating support rings are terminally secured to said electrodes and coaxially disposed within said vacuum chamber.

17. In a Pyrotron comprising an elongated cylindrical evacuated vacuum chamber, a solenoidal winding disposed coaxially about said chamber, a pair of solenoidal segments disposed coaxially about the end regions of said winding, electrical energizing means connected to said winding and segments to establish an axially symmetric magnetic field having axially spaced gradientially-intensified reflector field regions situated therein, and plasma generating means disposed within said vacuum chamber for introducing plasma to said magnetic field, the improvement comprising a pair of axially elongated radiofrequency electrodes having open symmetrical trapezoidal cross sections and axially disposed in symmetrical diametric opposition between the central transverse planes of said solenoidal segments, a pair of rigid axially elongated arcuate backing members correspondingly secured in circumscribing relationship to the outside peripheral surfaces of said electrodes, a pair of electrically insulating support rings secured to the ends of said electrodes and having outside diameters approximately equal to the bore diameter of said vacuum chamber, said support rings coaxially disposed within said chamber at the central transverse planes of said solenoidal segments respectively, terminal means connected to said electrodes and extending exteriorly of said vacuum chamber, and a radiofrequency oscillator connected to said terminal means for energizing said electrodes to establish an alternating electric enhancing field transversely of said magnetic field.

18. In a Pyrotron as defined by claim 17, further defined by said coaxial terminal means comprising a pair of insulated coaxial feedthrough couplers mounted in hermetically sealed relationship in one end closure of said vacuum chamber, a pair of elongated conducting rods respectively connected to said electrodes and extending axially through said coaxial couplers to terminate thereat in coaxial transmission line energizing terminals, and a pair of coaxial transmission lines connecting said oscillator to said terminals.

19. A linear multiple zone Pyrotron comprising means for establishing an evacuated region, solenoid means disposed within said region for generating an axially symmetric magnetic field having spaced gradientially-intensified reflector field regions therein with a first plateau region of uniform intensity defining a superheating zone and a second plateau region of lesser uniform intensity defining a reaction zone between said reflector field regions, means for directing energetic ions into the reflector field region which adjoins said superheating zone, and means including radiofrequency electrode means disposed across said first plateau region for applying a transverse alternating electric field thereto.

20. A linear multiple zone Pyrotron comprising an evacuated vacuum chamber, an elongated solenoidal winding disposed coaxially within said chamber, a first solenoidal segment disposed concentrically about one end region of said winding, a second solenoidal segment disposed concentrically about the other end region of said winding and extending inwardly therefrom, a third solenoidal segment disposed concentrically about the end region of said second segment, electrical energizing means connected to said solenoidal winding and segments to establish an axially symmetric magnetic field having spaced gradientially-intensified reflector field regions therein with a first plateau region of uniform intensity defining a superheating zone merging smoothly to a second plateau region of lesser uniform intensity defining a reaction zone between said reflector field regions, ion source means disposed axially outwardly from the reflector field region which adjoins said superheating zone for directing a space charge neutralized ion beam into the reflector field region, a pair of radiofrequency electrodes oppositely disposed transversely across said superheating zone, and a radiofrequency oscillator connected across said electrodes to energize same and establish an alternating electric field transverse to said magnetic field for imparting angular acceleration to said ion beam in said superheating zone, whereby the energy of the ions is increased therein and the heated ions continuously progress by preferential diffusion into said reaction zone to be trapped therein for appreciable periods of time.

21. A linear multiple zone Pyrotron as defined by claim 20 wherein said radiofrequency electrodes have a trough-like cross section and a pair of electrically insulating support rings are terminally secured to said electrodes and coaxially disposed within said vacuum chamber.

References Cited in the file of this patent

UNITED STATES PATENTS

| | | |
|---|---|---|
| 2,636,990 | Gow | Apr. 23, 1953 |
| 2,728,877 | Fischer | Dec. 17, 1955 |
| 2,813,992 | Linder | Nov. 19, 1957 |
| 2,826,708 | Foster | Mar. 11, 1958 |
| 2,826,709 | Van Ardenne | Mar. 11, 1958 |
| 2,831,996 | Martina | Apr. 22, 1958 |
| 2,868,991 | Josephson et al. | Jan. 13, 1959 |
| 2,883,580 | Kilpatrick | Apr. 21, 1959 |

OTHER REFERENCES

J. Nuclear Energy, II, 1957, vol. 5, pp. 71–85. Pergamon Press, London, An Investigation of a High Current Gas Discharge in a Longitudinal Magnetic Field, Bezbatchenko et al.

February 1958, Nucleonics, pp. 90–93, 151–155.

Reviews of Modern Physics, vol. 28, No. 3, July 1956, pp. 338–340.

Project Sherwood, by Amasa S. Bishop, Addison-Wesley Publ. Co., September 1958, pages 128, 130, 131.

Progress in Nuclear Energy, Series XI, Plasma Physics and Thermonuclear Research, vol. I, editors C. Longmore etc., Pergamon Press, N.Y., 1959, pp. 154, 155, 166, 167, 177–182, 184, 185, 193, 194, 195.